UNITED STATES PATENT OFFICE.

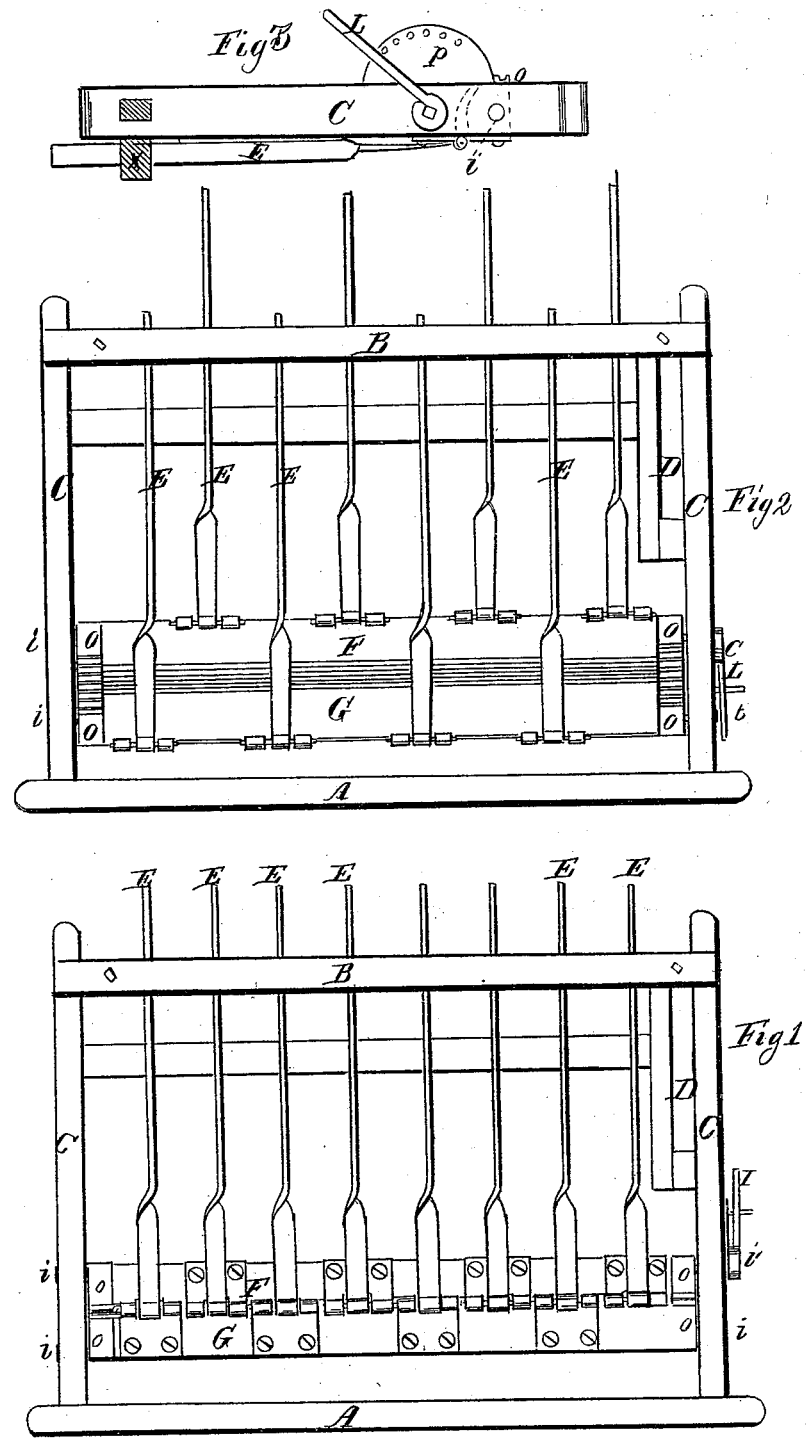

JOHN D. HARRISON, OF MIDDLETOWN, OHIO.

IMPROVEMENT IN SEEDING-MACHINES.

Specification forming part of Letters Patent No. 93,989, dated August 24, 1869.

*To all whom it may concern:*

Be it known that I, JOHN D. HARRISON, of Middletown, in the county of Butler, in the State of Ohio, have invented a new and useful Improvement in Seeding-Machines; and I do hereby declare that the following is a full and exact description thereof, reference being had to the accompanying drawings, and to the letters of reference marked thereon.

Figure 1 represents the under side of a portion of the frame-work of a seeding-machine with the drag-bars and their adjusting mechanism. Fig. 2 represents the under side of the same, with the drag-bars in double ranks. Fig. 3 represents an end view of the frame, drag-bar, and adjusting mechanism.

The object of my invention is to provide a simple and efficient means of adjusting the drag-bars and hoes to which they are to be connected, so that the hoes may be formed in single or double ranks, as herein fully described.

A B C denote the frame, and the narrow space D is formed to admit the wheel, which would actuate an agitator in a seed-box, in the usual manner.

The drag-bars E, to which hoes are attached in a complete machine, are hinged to the two adjusting-bars F G, as represented in Figs. 1 and 2. The end of the bars F G are provided with quadrant-shaped metal sockets, having segmental gearing and journals, as represented in dotted lines in Fig. 3. The two bars F G correspond in form with the sockets o.

The journals i have their boxes in the frame-pieces c c, and occupy a proper relation to each other to bring the segmental gearing upon the sockets o into mesh at each side of the machine. One of the journals, i', extends out beyond the frame to receive a hand-lever, L, by which an attendant may adjust the rollers or bars F G.

The drag-bars E are hinged alternately to the bar F and G, as clearly represented in Fig. 2.

The bars E will remain in any position to which they are adjusted, without the aid of the pin p in the block s, because the draft, in propelling the machine with the hoes attached to the drag-bars, is sustained by the hinged connections equally by the bars E and G, which are adjusted upon their axes in opposite directions.

In clean, fine soil, the drag-bars will be adjusted by lever L to occupy a single rank, and consequently the hoes through which the seed will be conducted to the ground will also occupy a similar position. But, in weedy or cloddy ground, the hoes should be adjusted to the double ranks, as then the clods and weeds may freely escape between them.

I am aware that various devices have been employed to effect this object, but by my invention I dispense with much of the mechanism heretofore employed, and actuate the bars to which the drag-bars are attached directly, without the interposition of an additional longitudinal connecting-bar.

The frame-piece x will be removed when the drag-bars are hinged to their respective hoes in the working machine.

The same operation secured by my two rotary bars F G may be produced by one rotary bar and one sliding bar, when the two are connected together in the proper manner.

Having fully described my new and useful improvement in grain-seeding machines, what I claim, and desire to secure by Letters Patent, is—

The combination of the gearing-sockets o with the bars F G and drag-bars E, constructed, arrranged, and operated substantially as and for the purpose described.

In testimony whereof I have hereunto set my hand this 5th day of July, 1869.

JOHN D. HARRISON.

Witnesses:
H. P. K. PECK,
S. E. PECK.